US012355130B2

(12) United States Patent
Kim et al.

(10) Patent No.: US 12,355,130 B2
(45) Date of Patent: Jul. 8, 2025

(54) MULTI INPUT AND MULTI OUTPUT ANTENNA APPARATUS

(71) Applicant: KMW INC., Hwaseong-si (KR)

(72) Inventors: Duk Yong Kim, Yongin-si (KR); Kyo Sung Ji, Hwaseong-si (KR); Chi Back Ryu, Hwaseong-si (KR); Bae Mook Jeong, Suwon-si (KR)

(73) Assignee: KMW INC., Hwaseong-si (KR)

( * ) Notice: Subject to any disclaimer, the term of this patent is extended or adjusted under 35 U.S.C. 154(b) by 233 days.

(21) Appl. No.: 18/074,597

(22) Filed: Dec. 5, 2022

(65) Prior Publication Data

US 2023/0109083 A1 Apr. 6, 2023

Related U.S. Application Data

(63) Continuation of application No. PCT/KR2021/006986, filed on Jun. 4, 2021.

(30) Foreign Application Priority Data

Jun. 5, 2020 (KR) ........................ 10-2020-0068638
Jun. 3, 2021 (KR) ........................ 10-2021-0072088

(51) Int. Cl.
*H01Q 1/02* (2006.01)
*H01Q 1/38* (2006.01)
(Continued)

(52) U.S. Cl.
CPC ................. *H01Q 1/02* (2013.01); *H01Q 1/38* (2013.01); *H01Q 1/48* (2013.01); *H01Q 1/526* (2013.01); *H01Q 21/28* (2013.01)

(58) Field of Classification Search
CPC .......... H05K 7/02; H05K 7/2039; H05K 1/02; H05K 1/021; H05K 2201/06;
(Continued)

(56) References Cited

U.S. PATENT DOCUMENTS 11,081,777 B2 * 8/2021 Kim ......................... H01Q 1/42
2009/0117899 A1 * 5/2009 Shiff .................... H04B 7/2606 455/436
(Continued)

FOREIGN PATENT DOCUMENTS

CN 109980365 A 7/2019
JP H11-297876 A 10/1999
(Continued)

OTHER PUBLICATIONS

International Search Report mailed Sep. 6, 2021 for International Application No. PCT/KR2021/006986 and its English translation.
(Continued)

*Primary Examiner* — Dimary S Lopez Cruz
*Assistant Examiner* — Austin M Back
(74) *Attorney, Agent, or Firm* — Insight Law Group, PLLC; Seung Lee

(57) ABSTRACT

The present invention relates to relates to a multi-input and multi-output antenna apparatus, and particularly, to a multi-input and multi-output antenna apparatus including a main board having an accommodation space formed in at least one region and provided in the form of a predetermined space, and a sub-board stacked on a rear surface portion of the main board and configured such that a plurality of heating elements is mounted on a front surface portion of the sub-board that is directed toward the accommodation space, in which heat generated from the heating elements is dissipated to a rear surface portion of the sub-board, which makes it possible to improve heat dissipation performance of the antenna apparatus and improve frequency filtering performance of the antenna apparatus.

26 Claims, 11 Drawing Sheets

(51) Int. Cl.
*H01Q 1/48* (2006.01)
*H01Q 1/52* (2006.01)
*H01Q 21/28* (2006.01)

(58) Field of Classification Search
CPC ...... H05K 2201/066; H01Q 1/02; H01Q 1/38; H01Q 1/52
See application file for complete search history.

(56) References Cited

U.S. PATENT DOCUMENTS

| | | | | |
|---|---|---|---|---|
| 2015/0115303 | A1* | 4/2015 | Pachler | H01L 33/60 257/98 |
| 2018/0211897 | A1* | 7/2018 | Yang | H01L 23/49568 |
| 2018/0316086 | A1 | 11/2018 | Lehman et al. | |
| 2019/0237850 | A1* | 8/2019 | Fleischer | H01Q 3/02 |
| 2019/0268046 | A1* | 8/2019 | Kim | H01Q 25/001 |
| 2019/0333882 | A1* | 10/2019 | Kamgaing | H01L 23/49827 |
| 2020/0127361 | A1* | 4/2020 | Lee | H01Q 1/2283 |

FOREIGN PATENT DOCUMENTS

| | | | |
|---|---|---|---|
| KR | 10-2018-0134076 | A | 12/2018 |
| KR | 10-2019-0118979 | A | 10/2019 |
| KR | 10-2019-0126336 | A | 11/2019 |
| KR | 10-2020-0051617 | A | 5/2020 |
| WO | 2018-001007 | A | 1/2018 |
| WO | 2019/058646 | A1 | 3/2019 |

OTHER PUBLICATIONS

Non-final office action mailed Aug. 4, 2022 from the Korean Intellectual Property Office for Korean Application No. 10-2021-0072088.

Non-final Office Action mailed on Jan. 30, 2024 from the Japanese Patent Office for Japanese Application No. 2022-574323.

European Search Report for Application No. 21817076.9-1201 dated Sep. 10, 2024.

Junho Park et al. "Millimeter-Wave Phased-Array Antenna-in-Package (AiP) Using Stamped Metal Process for Enhanced Heat Dissipation". IEEE Antennas and Wereless Propagation Letters, Nov. 2019, pp. 2355-2359, vol. 18, No. 11.

* cited by examiner

MULTI INPUT AND MULTI OUTPUT ANTENNA APPARATUS

CROSS-REFERENCE TO RELATED APPLICATIONS

This application is a continuation application of International Application No. PCT/KR2021/006986, filed Jun. 4, 2021, which claims the benefit of Korean Patent Application Nos. 10-2020-0068638, filed Jun. 5, 2020; and 10-2021-0072088, filed Jun. 3, 2021, in the Korean Intellectual Property Office, the disclosures of which are incorporated herein in their entirety by reference.

TECHNICAL FIELD

The present invention relates to a multi-input and multi-output antenna apparatus, and more particularly, to a multi-input and multi-output antenna apparatus capable of improving antenna performance by efficiently dissipating heat generated from an RF element and heat generated from an RF filter to a rear side of a main housing.

BACKGROUND ART

As an example of wireless communication technologies, a multiple-input/multiple-output (MIMO) technology refers to a technology for innovatively increasing data transmission capacity by using a plurality of antennas. This technology uses a spatial multiplexing technique, in which a transmitter transmits different data through the respective transmitting antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, in case that the number of antennas increases to ten, the channel capacity of about 10 times is ensured by using the same frequency band in comparison with the current single antenna system. In the case of a transmitting/receiving device to which the MIMO technology is applied, the number of transmitters and the number of filters also increase as the number of antennas increases.

In particular, a plurality of substrates (e.g., a printed board assembly (PBA) disposed in an installation space of a main housing and provided in close contact with a rear surface of the main housing, an antenna board stacked at a front side of the PBA and disposed to be spaced apart from the PBA at a predetermined distance, and a PSU substrate disposed at one side of the PBA or the antenna board) is disposed and stacked in the main housing, and a plurality of RF power supply network element and an RF filter, which generate a large amount of driving heat during an operation, are installed in the main housing.

However, the multi-input and multi-output antenna apparatus in the related art needs to effectively dissipate a large amount of driving heat, which is generated in the main housing during the operation, to the outside of the main housing (particularly, to the rear side of the main housing). To this end, the multi-input and multi-output antenna apparatus adopts a structure in which a heating element is mounted on a front surface of the PBA, and then a plurality of via holes is processed to be formed through a rear side of the PBA, which is a mounting surface of the heating element, or heat transfer coins are installed at positions corresponding to the plurality of via holes to dissipate heat.

However, because the PBA is generally made of a substrate material having low thermal conductivity, the structure that discharges heat through the via holes has a problem in that low heat dissipation efficiency because of a small contact area between the heating element and the via holes. Meanwhile, the structure using the heat transfer coin also has a problem in that a predetermined heat dissipation effect is degraded by a contact tolerance of a contact surface with the heating element.

DISCLOSURE

Technical Problem

The present invention has been made in an effort to solve the above-mentioned technical problem, and an object of the present invention is to provide a multi-input and multi-output antenna apparatus capable of maximizing heat dissipation performance by means of a sub-board separated from a main board so as to be in close and direct contact with a rear surface of a main housing.

The present invention has also been made in an effort to provide a multi-input and multi-output antenna apparatus, in which heating elements such as RF power supply network elements are distributed and mounted on front and rear surfaces of a sub-board to increase a ground contact area, and enable impedance matching with a ground pattern of the sub-board.

The present invention has also been made in an effort to provide a multi-input and multi-output antenna apparatus, in which a clamshell part is integrated with a rear end of a multi-band filter, and a portion between Tx/Rx and Tx/Tx in the same multi-band filter is isolated by using the integrated clamshell part, which makes it possible to ensure isolation and reduce signal interference.

Technical problems of the present invention are not limited to the aforementioned technical problems, and other technical problems, which are not mentioned above, may be clearly understood by those skilled in the art from the following descriptions.

Technical Solution

An embodiment of the present invention provides a multi-input and multi-output antenna apparatus including: a main board having an accommodation space formed in at least one region and provided in the form of a predetermined space; and a sub-board stacked on a rear surface portion of the main board and configured such that a plurality of heating elements is mounted on a front surface portion of the sub-board that is directed toward the accommodation space, in which heat generated from the heating elements is dissipated to a rear surface portion of the sub-board.

In this case, the main board may be disposed relatively forward of the sub-board, the front surface portion of the sub-board may be disposed and stacked to be in close contact with a part of the rear surface portion of the main board, the accommodation space may be formed in an area that is not in contact with the rear surface portion of the main board, and the plurality of heating elements may be mounted on the front surface portion corresponding to the accommodation space.

In addition, the main board may be an integrated circular board made by stacking multiple layers in a forward/rearward direction and integrally bonding the multiple layers, the accommodation space may be formed by removing at least some of the multiple layers in a partial region of the rear surface portion, the sub-board may be stacked on a rear surface portion of a layer positioned at a rearmost side of the main board among the multiple layers, and the plurality of heating elements may be mounted on the front surface portion that is directed toward the accommodation space.

In addition, the amount of thermal expansion of the sub-board, which is made by an increase in temperature according to an operation of the heating elements, may be smaller than the amount of thermal expansion of the main board.

In addition, a thickness of the sub-board in a forward/rearward direction may be smaller than a thickness of the main board in the forward/rearward direction.

In addition, first heating elements may be disposed on a front surface portion of the main board, second heating elements may be disposed on the front surface portion of the sub-board, and output power of the second heating elements may be higher than output power of the first heating elements.

In addition, the first heating element may be an Rx element (LNA), and the second heating element may be a Tx element (PA and DA).

In addition, third heating elements may be further disposed on the rear surface portion of the main board.

In addition, the third heating element may include an FPGA.

In addition, digital semiconductors may be mounted and disposed on a portion of the rear surface portion of the main board that does not overlap the front surface portion of the sub-board, and heat generated from the digital semiconductors of the main board may be dissipated to the rear surface portion of the sub-board together with heat generated from the plurality of heating elements of the sub-board.

In addition, the main board and the sub-board may each be made of epoxy resin.

In addition, the main board may include a plurality of sections having a plurality of transmitting/receiving channels, and the sub-board may correspond in number to the plurality of sections.

In addition, the sub-board may further include an oscillation prevention circuit configured to prevent oscillation of the heating elements.

In addition, the sub-board may be a multilayer substrate having at least two layers.

In addition, active elements, as some of the heating elements, may be mounted and disposed on a layer corresponding to a front surface of the sub-board, passive elements, as the remaining heating elements, may be disposed on a layer corresponding to a rear surface of the sub-board, and heat generated from the active and passive elements may be dissipated to the rear surface of the sub-board.

In addition, a ground pattern (GND pattern) may be formed between the heating elements on the layer corresponding to the rear surface of the sub-board, the ground pattern may be in contact with an inner surface of an antenna housing part on which the main board and the sub-board are installed, and the ground pattern may increase an area for blocking an electromagnetic wave generated from the sub-board.

In addition, the sub-board may have at least two layers bonded in the same way as the multiple layers of the main board.

In addition, at least one heat transfer bridge hole may be formed in the sub-board so that heat generated from the heating elements is discharged rearward.

In addition, the heat transfer bridge hole may be filled with a thermally conductive material.

In addition, the sub-board may be a metal PCB.

In addition, the multi-input and multi-output antenna apparatus may further include an antenna housing part including: a front portion having a mounting space in which the main board and the sub-board are installed; and a rear portion integrated with a plurality of heat sink fins configured to receive heat generated from the heating elements and dissipate the heat to the outside.

In addition, the rear surface portion of the sub-board and an inner surface of the antenna housing part may be thermally in surface contact with each other so that heat generated from the heating elements is transferred to the rear surface portion of the sub-board and dissipated through the plurality of heat sink fins.

In addition, the multi-input and multi-output antenna apparatus may further include: a plurality of filters each having an accommodation space configured to accommodate a resonator, the plurality of filters being seated on a front portion of the main board; and an antenna board stacked on front portions of the plurality of filters and having a front surface on which a plurality of antenna elements for establishing predetermined electrical signal lines through the plurality of filters are mounted.

In addition, a clamshell part may be integrated with a rear end of each of the plurality of filters and configured to block signal interference with the electrical signal line.

In addition, a plurality of transmitting channels and a plurality of receiving channels corresponding to the electrical signal lines may be provided on a front surface of the main board, and the clamshell part may include a transmitting/receiving partition rib configured to spatially separate and isolate a region of the transmitting channel and a region of the receiving channel.

In addition, the clamshell part may further include transmitting part partition ribs configured to spatially separate and isolate a pair of transmitting circuit patterns provided in the transmitting channels and spaced apart from each other at a predetermined distance.

In addition, at least one position fixing protrusion may protrude from a rear end of each of the plurality of filters toward the main board, and when the at least one position fixing protrusion is seated in at least one positioning groove formed at a corresponding position of the main board, the transmitting/receiving partition rib and the transmitting part partition ribs of the clamshell part may completely separate the region of the transmitting channel, the region of the receiving channel, and the transmitting circuit pattern.

In addition, a pair of main-board-side RF connectors may be provided at the rear end of each of the plurality of filters and electrically connected to the main board, and a pair of antenna-board-side RF connectors may be provided at a front end of each of the plurality of filters and electrically connected to the antenna board stacked on the front ends of the plurality of filters.

Advantageous Effects

The embodiment of the multi-input and multi-output antenna apparatus according to the present invention may achieve the following various effects.

First, the sub-board is used, independently of the main board, to more easily dissipate heat, which is generated from the heating elements, to the outside of the antenna housing part, which makes it possible to improve the heat dissipation performance.

Second, the sub-board includes two layers, which makes it possible to improve the grounding and shield effect between the sub-board and the antenna housing part.

Third, the clamshell part is integrally formed at the rear end of the multi-band filter, and a space in which the resonator is installed is expanded, which makes it possible to improve filter performance.

Fourth, it is possible to block electromagnetic waves by performing the single process of assembling the plurality of sections including the plurality of transmitting/receiving channels included in the main board by using the clamshell part integrated with the multi-band filter.

The effects of the present invention are not limited to the aforementioned effects, and other effects, which are not mentioned above, will be clearly understood by those skilled in the art from the claims.

EXPLANATION OF REFERENCE NUMERALS AND SYMBOLS

Figure 1:
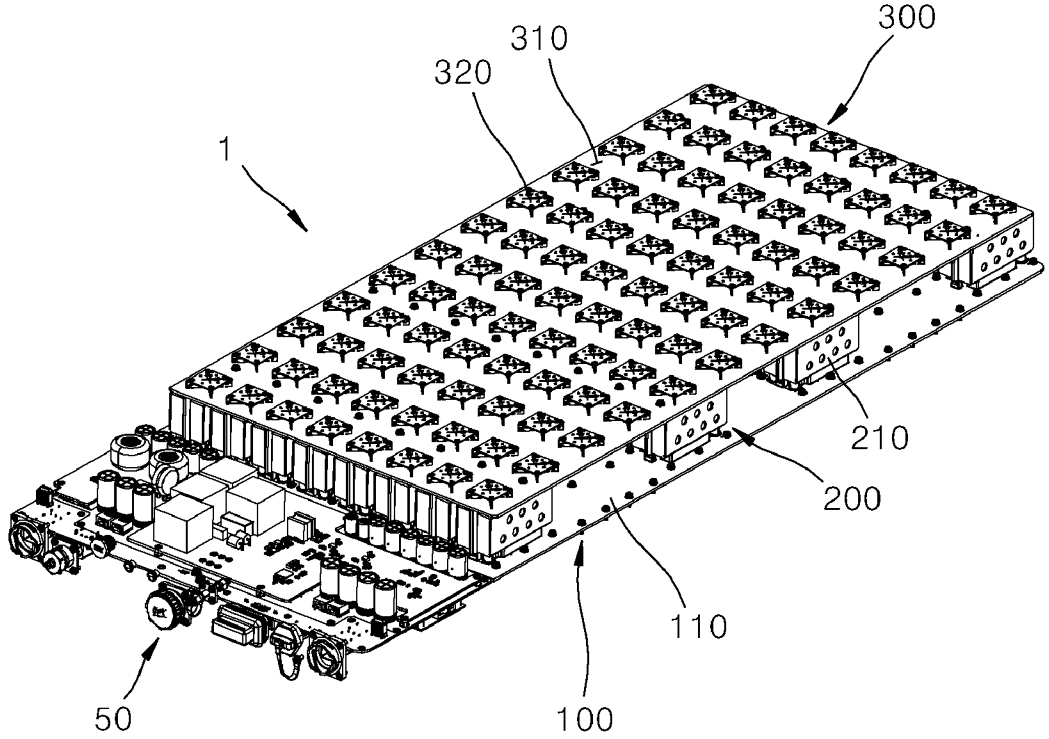
FIG. 1 is a perspective view illustrating an embodiment of a multi-input and multi-output antenna apparatus according to the present invention.

1: Multi-input and multi-output antenna apparatus
100: First stack assembly
110: Main board
150: Sub-board
200: Second stack assembly
210: Multi-band filter
250: Clamshell part
300: Third stack assembly
310: Antenna board
320: Antenna element

BEST MODE

Hereinafter, a multi-input and multi-output antenna apparatus according to an embodiment of the present invention will be described in detail with reference to the accompanying drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

Figure 2:
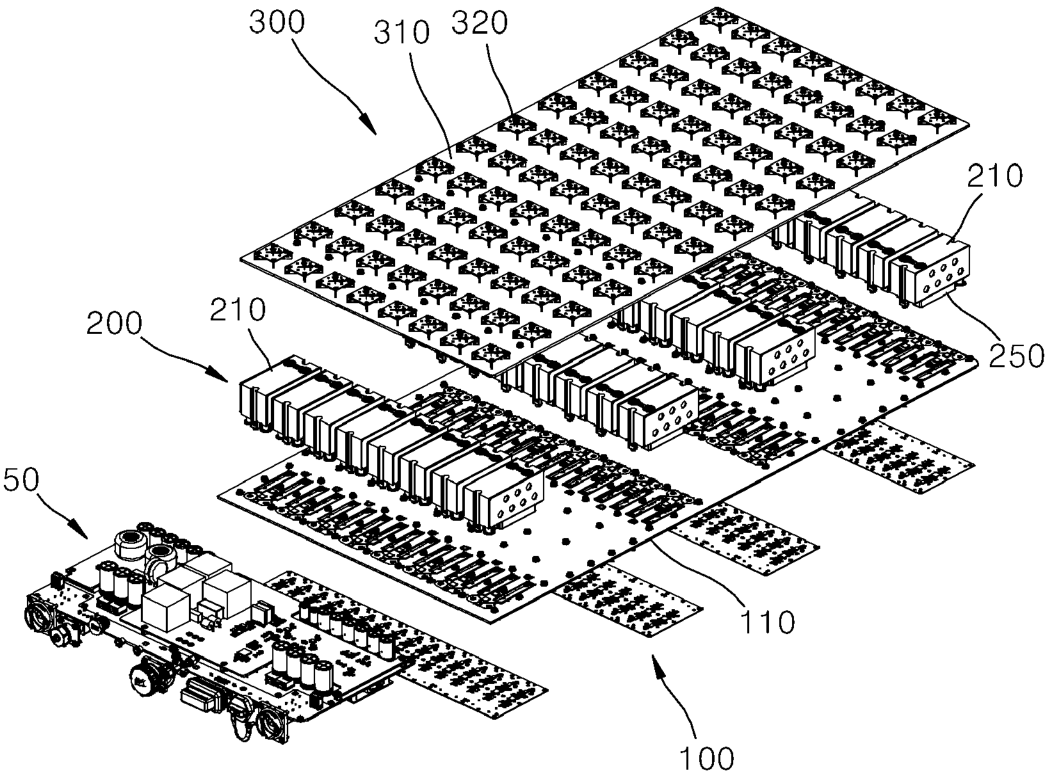
FIG. 2 is an exploded perspective view of FIG. 1.
Figure 3:
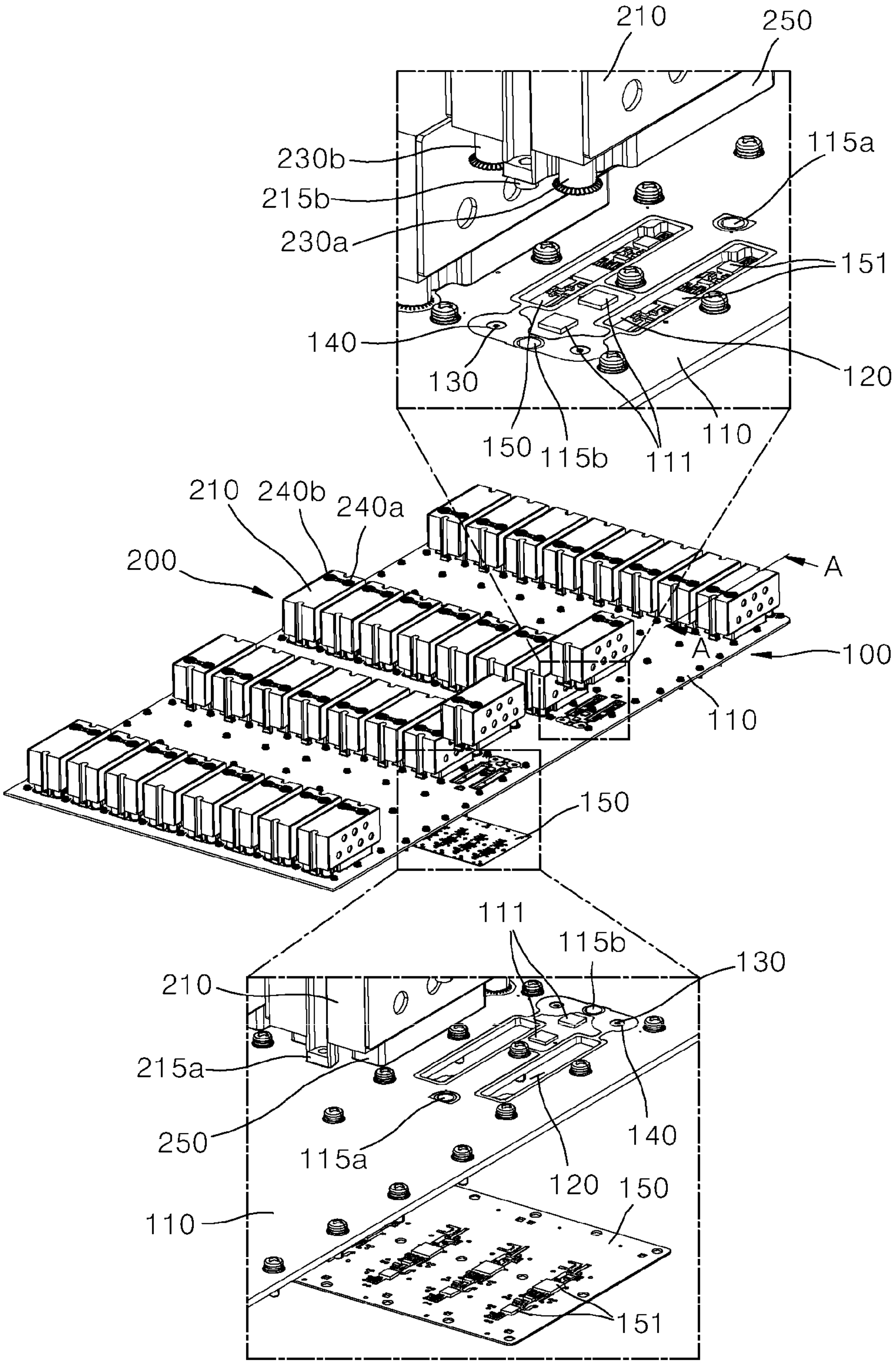
FIG. 3 is an exploded perspective view of FIG. 1, i.e., an exploded perspective view illustrating a state in which a sub-board and a multi-band filter are separated from a main board.

FIG. 1 is a perspective view illustrating an embodiment of a multi-input and multi-output antenna apparatus according to the present invention, FIG. 2 is an exploded perspective view of FIG. 1, and FIG. 3 is an exploded perspective view of FIG. 1, i.e., an exploded perspective view illustrating a state in which a sub-board and a multi-band filter are separated from a main board.

An embodiment of a multi-input and multi-output antenna apparatus 1 according to the present invention includes: a first stack assembly 100 having mounting spaces opened forward (upward based on FIG. 1) and primarily stacked in a mounting space of an antenna housing part (not illustrated) having a rectangular parallelepiped shape having a forward/rearward accommodation width that is long and thin in an approximately upward/downward direction; a second stack assembly 200 fixedly mounted on a front surface of the first stack assembly 100; and a third stack assembly 300 stacked at a front end of the second stack assembly 200.

Further, as illustrated in FIGS. 1 and 2, the embodiment of the multi-input and multi-output antenna apparatus 1 according to the present invention may further include a power supply unit (hereinafter, referred to as 'PSU') 50 disposed at one end (a lower end) of the first stack assembly 100 based on a longitudinal direction of the first stack assembly 100 and configured to supply power to a plurality of RF power supply network components provided in the first to third stack assemblies 100, 200, and 300.

The PSU 50 serves to control a supply of power to the plurality of RF power supply network components provided in the first to third stack assemblies 100, 200, and 300 to perform calibration power supply control and frequency filtering.

As illustrated in FIGS. 2 and 3, the first stack assembly 100 may include a main board 110 and sub-boards 150.

Heating elements 111, 151, and 181, which are the plurality of RF power supply network components, may be distributed and mounted on front and rear surfaces of the main board 110 and front and rear surfaces of the sub-boards 150 and discharge predetermined heat when the heating elements 111, 151, and 181 are operated by applied power.

The main board 110 and the sub-board 150 may each be configured as a F4 resin-based substrate made of epoxy resin. However, the main board 110 and the sub-board 150 need not be necessarily made of epoxy resin, but the main board 110 and the sub-board 150 may be made of different materials according to a main function of the substrate. For example, as described below, the sub-board 150 may be made of a metal PCB material because the sub-board 150 preferentially requires a heat dissipation function.

The main board 110 may have a predetermined thickness. As described above, the main board 110 may be provided in the form of a quadrangular, thin board made of epoxy resin.

In this case, one or more low noise amplifiers (LNAs), which are Rx elements, i.e., first heating elements among the heating elements, may be mounted on a front surface of the main board 110. In addition, digital semiconductor elements such as field programmable gate arrays (FPGAs), which are third heating elements among the heating elements, may be mounted and disposed on a rear surface of the main board 110. The FPGA is mounted on the rear surface of the main board 110, and the rear surface of the main board 110 is exposed rearward without overlapping the sub-board 150. The FPGA is thermally in surface contact with an inner surface of the mounting space of the antenna housing part, such that the produced heat may be directly dissipated through a plurality of heat sink fins (not illustrated) integrated with a rear surface of the antenna housing part.

The main board 110 may include a plurality of sections having a plurality of transmitting/receiving channels. In this case, the plurality of transmitting/receiving channels includes a transmitting part channel and a receiving part channel, and the transmitting part channel and the receiving part channel may be patterned and disposed so as to be spaced apart from each other at a predetermined distance in a left and right width direction of the main board 110. The sections having the plurality of transmitting/receiving channels may be provided as a plurality of sections spaced apart from one another at predetermined distances in an upward/downward longitudinal direction of the main board 110.

In this case, the sections are formed in rows corresponding in number to unit multi-band filters 210 among the components of the second stack assembly 200 to be described below. Within a range of one section, sixteen Tx elements and sixteen Rx elements are mounted and arranged. As the four sections are provided, a massive MIMO technology having a transmission capacity of 64T/R may be applied.

For reference, as described below, one unit multi-band filter 210 may have two cavities 205 therein, and the two cavities 205 may be separated by a partition wall (no reference numeral). A resonator 215 in each of the cavities 205 may be used to perform frequency filtering through the transmitting channel and the receiving channel. Therefore, in a region corresponding to one unit multi-band filter 210, two Rx elements (LNA), which are first heating elements 111 among the heating elements, and two Tx elements (a transistor (TR) and a power amplifier (PA)), which are second heating elements, may be mounted and disposed in corresponding regions of the main board 110 and the sub-board 150.

Meanwhile, the sub-board 150 may serve as an auxiliary substrate coupled to be in close contact with the rear surface of the main board 110. In this case, a thickness of the sub-board 150 may be relatively smaller than a thickness of the main board 110. In addition, the sub-board 150 may be thermally in direct contact with the inner surface of the mounting space of the antenna housing part and additionally serve to transfer heat generated from the plurality of heating elements 111, 151, and 181. Therefore, the sub-board 150 may be configured as a metal PCB that may more easily transfer heat than epoxy resin.

As described above, pattern circuits may be printed on the front surfaces of the sub-boards 150, and the two Tx elements, which are the second heating elements 151 among the heating elements, may be mounted on the pattern circuits. The second heating elements 151 are mounted, one by one, on the pattern circuits, and the two pattern circuits may complete the transmitting channel and the receiving channel. The transmitting channel and the receiving channel may be electrically connected to a pair of main-board-side RF connectors 230 provided on the unit multi-band filter 210 to be described below.

Figure 4:
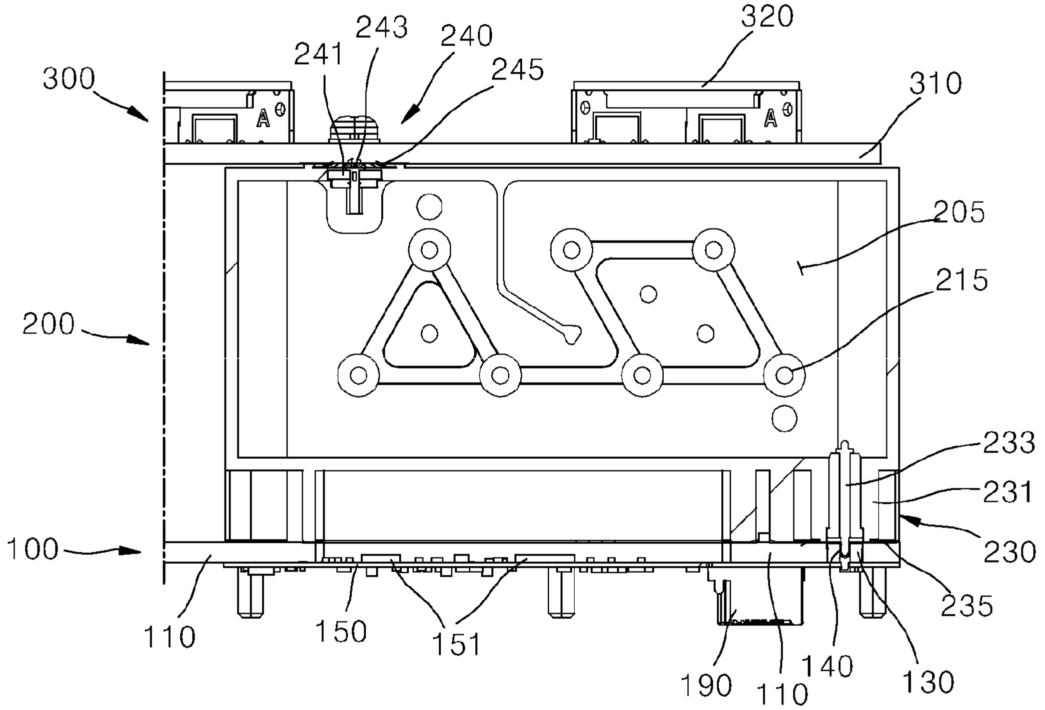
FIG. 4 is a partially cross-sectional view taken along line A-A in FIG. 3.
Figure 5A:
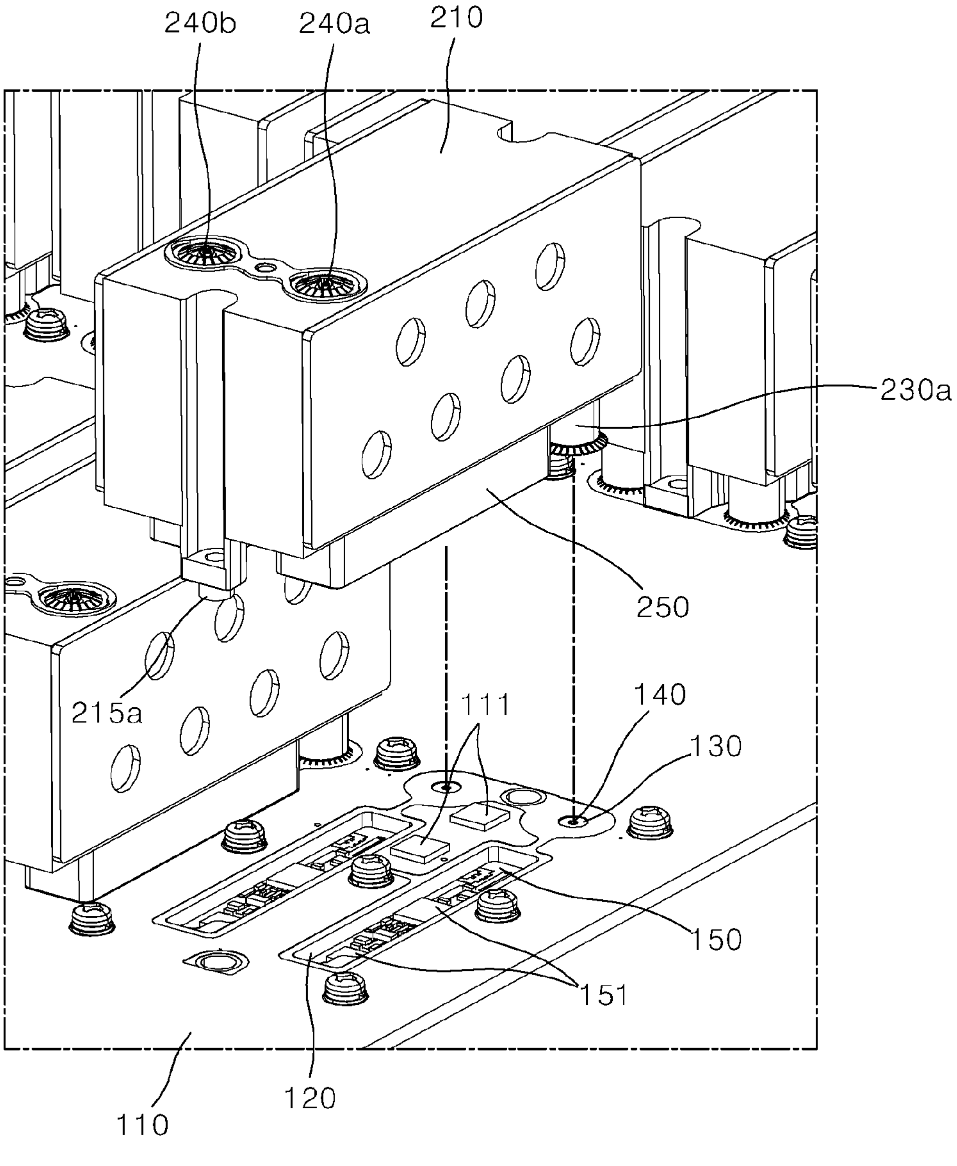
FIGS. 5A and 5B are exploded perspective views of FIG. 1, i.e., downward and upward perspective views illustrating a state in which the multi-band filter is separated from the main board.
Figure 5B:
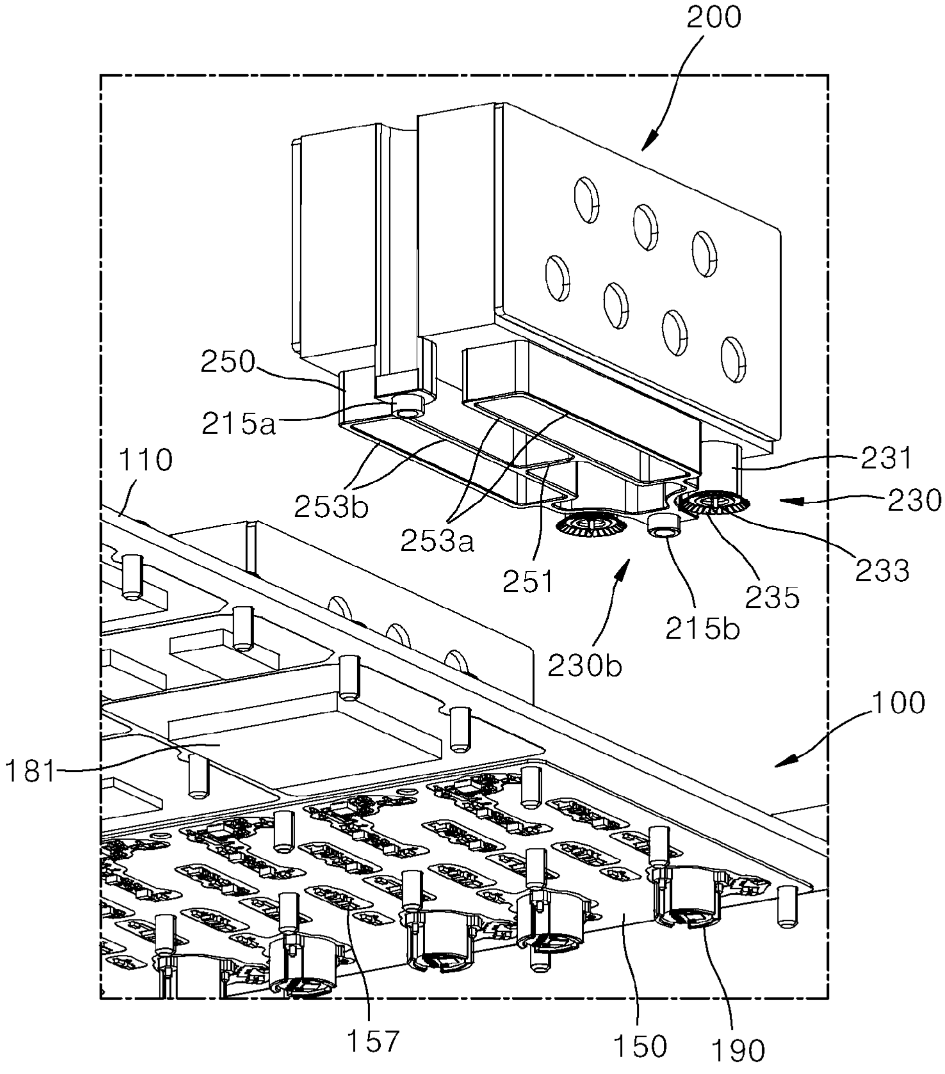
Figure 6A:
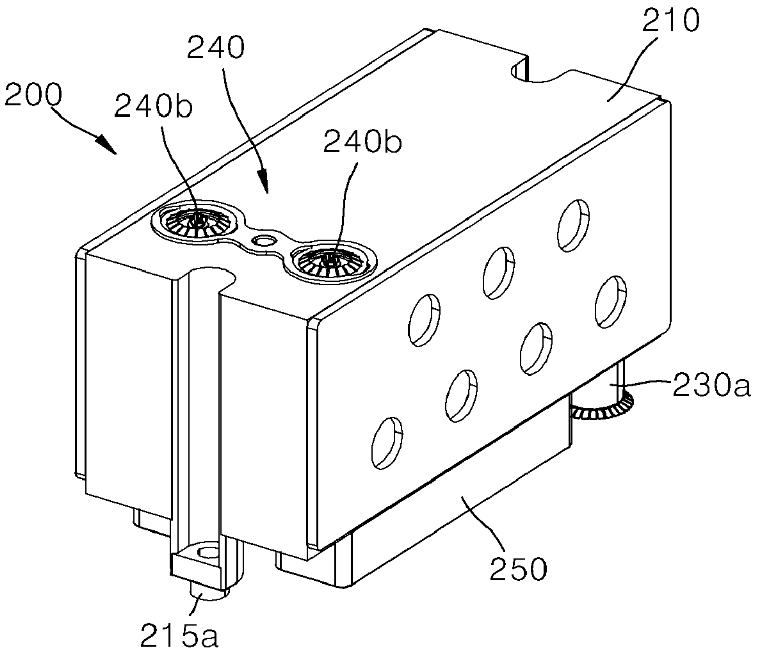
FIGS. 6A and 6B are downward and upward perspective views illustrating the multi-band filter among the components in FIG. 1.
Figure 6B:
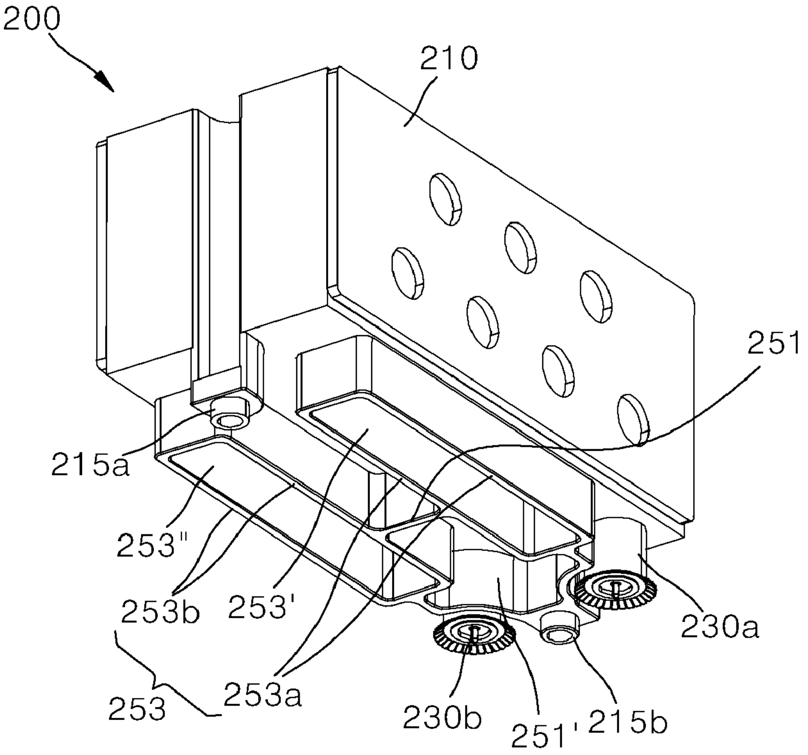
Figure 7:
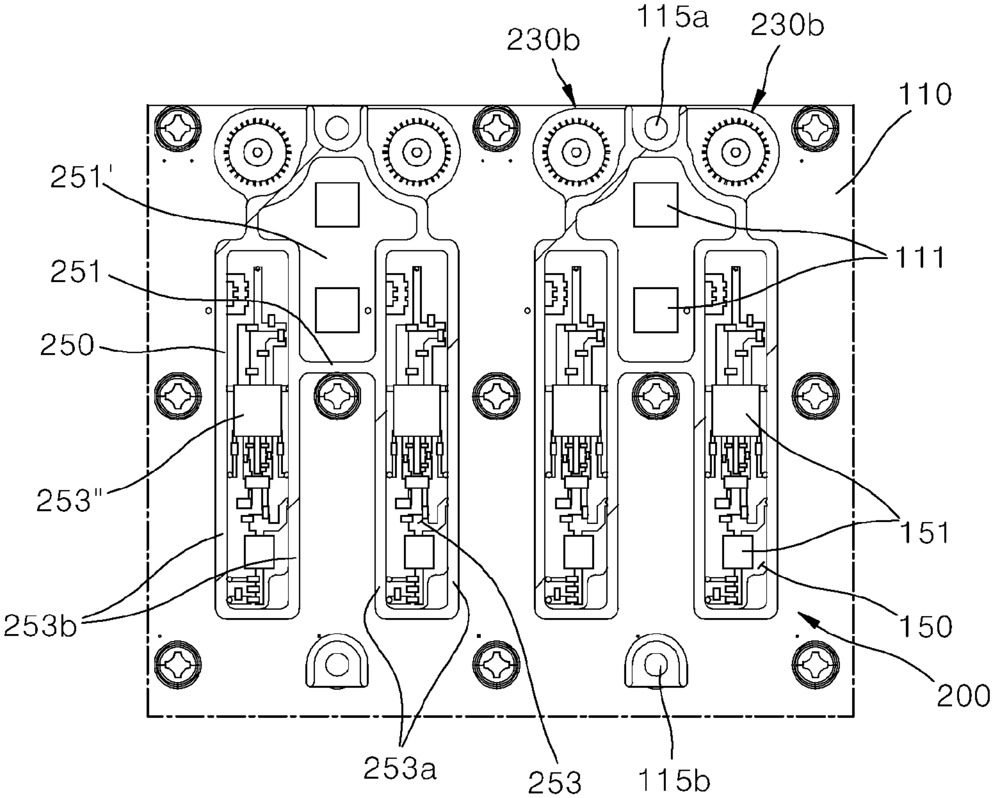
FIG. 7 is a cross-sectional view illustrating a plurality of section regions of the main board divided by a clamshell part among the components of the multi-band filter.

FIG. 4 is a partially cross-sectional view taken along line A-A in FIG. 3, FIGS. 5A and 5B are exploded perspective views of FIG. 1, i.e., downward and upward perspective views illustrating a state in which the multi-band filter is separated from the main board, FIGS. 6A and 6B are downward and upward perspective views illustrating the multi-band filter among the components in FIG. 1, and FIG. 7 is a cross-sectional view illustrating a plurality of section regions of the main board divided by a clamshell part among the components of the multi-band filter.

As illustrated in FIGS. 4 to 6, the second stack assembly 200 may include the filters 210 disposed between the main board 110 of the first stack assembly 100 and an antenna board 310 of the third stack assembly 300 and configured to perform frequency filtering. In this case, any one of a cavity filter, a waveguide filter, and a dielectric filter may be adopted as the filter 210. Further, the filter does not exclude the multi-band filter (MBF) that covers a multi-frequency band.

As described above, the filters 210 are provided as a plurality of filters 210 fixed to cover regions corresponding to the plurality of sections provided on the main board 110, and the corresponding region may include a pair of transmitting channel and receiving channel.

More specifically, the two cavities 205 of the filter 210 are divided into left and right cavities by the partition wall, and the plurality of resonators 215 respectively provided in the cavities 205 may perform frequency filtering through the transmitting channel and the receiving channel.

The filter 210 may have an inner surface plated in the form of a metal thin film to block outside noise (signals made by electromagnetic waves) in the cavity 205 in the filter 210 and outside noise. As described below, the same may also apply to a clamshell part 250 integrated with a rear end of the filter 210.

Meanwhile, one or more positioning grooves 115*a* and 115*b* for designating an installation position for the unit MBF 210 may be formed in the main board 110. In this case, one or more position fixing protrusions 215*a* and 215*b* may also be formed at a rear end of the unit filter 210, and the one or more position fixing protrusions 215*a* and 215*b* may protrude toward the main board 110 so as to be fixedly and respectively inserted into the one or more positioning grooves 115*a* and 115*b* formed in the main board 110.

Further, the clamshell part 250 may be integrated with the rear end of the filter 210 and block signal interference with an electrical signal line.

As illustrated in FIGS. 5A, FIGS. 5B, and 7, the clamshell part 250 may include: a transmitting/receiving partition rib 251 configured to isolate and spatially divide regions of a transmitting channel 253" and a receiving channel 251' included in the main board 110; and a pair of transmitting part partition ribs 253*a* and a pair of transmitting part partition ribs 253*b* provided in the transmitting channel 253"

and configured to isolate and spatially divide transmitting circuit patterns spaced apart from one another at predetermined distances.

In this case, the transmitting/receiving partition rib 251 of the clamshell part 250 serves to spatially separate and isolate the pair of Rx elements that is the first heating elements 111 mounted on the front surface of the main board 110.

In addition, the transmitting part partition ribs 253*a* and 253*b* of the clamshell part 250 serve to spatially separate and isolate the two Tx elements that are the second heating elements 151 mounted on each of the pattern circuits of the sub-boards 150.

As described above, the partition ribs 251 and 253 of the clamshell part 250 integrated with the rear end of the filter 210 are used to maximally block influences of electromagnetic waves between the Rx elements and the Tx elements and block influences of signals between the pair of Tx elements, which makes it possible to significantly improve the frequency filtering performance.

In addition, because the clamshell part 250 is integrated with the rear end of the filter 210, the space of the cavity 205 of the filter 210 may be further expanded rearward, and large separation spaces of the plurality of resonators 215 may be ensured. Therefore, it is possible to ensure an additional effect of minimizing the amount of heat generation during the operation by increasing a Q value.

Meanwhile, the clamshell part 250 of the filter 210 is configured such that when the one or more position fixing protrusions 215*a* and 215*b* formed at the rear end of the clamshell part 250 are seated in the positioning grooves 115*a* and 115*b* of the main board 210, the rear end of the transmitting/receiving partition rib 251 and the rear end of the transmitting part partition rib 253 may come into close contact with the front surface of the main board 110 and completely separate the transmitting circuit patterns and the regions of the transmitting and receiving channels. In this case, the filter 210 may be assembled to the main board 210 by a predetermined assembling force by a non-illustrated assembling screw that penetrates the position fixing protrusions 215*a* and 215*b* and the positioning grooves 115*a* and 115*b*.

Further, as illustrated in FIGS. 5A and 5B, a pair of main-board-side RF connectors 230 is provided at the rear end of the filter 210 and electrically connected to the main board 110. A pair of antenna-board-side RF connectors 240 may be provided at the front end of the filter 210 and electrically connected to the antenna board 310 among the components of the third stack assembly 300 stacked at the front end of the filter 210.

The pair of main-board-side RF connectors 230 may have one side connector 230*a* and the other side connector 230*b* respectively connected to the cavities 205 of the filter 210 so as to be respectively designated to the transmitting channel and the receiving channel. The pair of antenna-board-side RF connectors 240 may also have one side connector 240*a* and the other side connector 240*b* respectively connected to the cavities 205 of the filter 210 so as to be respectively designated to the transmitting channel and the receiving channel.

In this case, as illustrated in FIG. 4, the main-board-side RF connector 230 may include a connecting boss 231, a connecting terminal pin 233 disposed to penetrate the inside of the connecting boss 231, and an elastic ground contact washer 235 configured to perform a grounding function while absorbing an assembling tolerance between the filter 210 and the main board 110.

Connecting parts 140 may each be provided in the form of a hole in the main board 110, and the connecting terminal pins 233 may be inserted and fastened to the connecting parts 140. A dielectric material 130 for impedance matching may be embedded around the connecting part 140. The connecting terminal pin 233 may penetrate the dielectric material 130 and be electrically connected to the sub-board 150 stacked and coupled to the rear surface of the main board 110 so as to transmit or receive a signal. In the related art, the sub-board 150 is not provided, but the connecting part 140 is provided on the front surface of the main board 110. For this reason, the dielectric material 130 for performing the impedance matching on the periphery of the connecting part 140 cannot be installed. However, according to the embodiment of the present invention, the sub-board 150 is separately stacked on the rear surface of the main board 110, and the dielectric material 130 is embedded and installed by a thickness of the main board 110, which makes it very easy to design the impedance matching with a ground layer of the sub-board 150.

Meanwhile, as illustrated in FIG. 4, the antenna-board-side RF connector 240 may include: a contact terminal pin 243 configured to come into contact with a contact part (no reference numeral) provided on a rear surface of the antenna board 310; a dielectric material block 241 configured to fix the contact terminal pin 243 to the filter 210 while maintaining impedance matching; and an elastic ground contact washer 245 configured to perform a grounding function while absorbing an assembling tolerance between the filter 210 and the antenna board 310.

In the multi-input and multi-output antenna apparatus 1 according to the embodiment of the present invention configured as described above, a signal received through the antenna element 320 of the third stack assembly 300 is filtered in a predetermined frequency band while passing through the filter 210, among the components of the second stack assembly 200, during the process of receiving the signal, inputted to the main board 110 of the first stack assembly 100, and then processed as data. In this case, the signal passes through the receiving part channel, and relevant elements, among the Rx elements and the Tx elements, operate, and heat is generated. The driving heat generated by this process passes through the sub-board 150 provided as a metal PCB, which makes it easy to discharge the heat rearward.

On the contrary, a signal transmitted from the main board 110 of the first stack assembly 100 may pass through the filter 210, among the components of the second stack assembly 200, during the process of transmitting the signal and filtered in a predetermined frequency band and then oscillated through the antenna element 320 of the third stack assembly 300. Even in this case, likewise, the signal passes through the transmitting part channel, and the relevant elements, among the Rx elements and the Tx elements, operate, and heat is generated. The driving heat generated by this process may be discharged rearward via the sub-board 150 provided as a metal PCB.

Further, the clamshell part 250 integrated with the rear end of the filter 210 spatially separates and isolates the receiving channel and the transmitting channel, which makes it possible to prevent signal interference.

As illustrated in FIGS. 1 to 7, the third stack assembly 300 may include: an antenna board 310 stacked and disposed at the front end of the filter 210; and a plurality of antenna elements 320 fixedly mounted on the front surface of the antenna board 310.

Figure 8A:
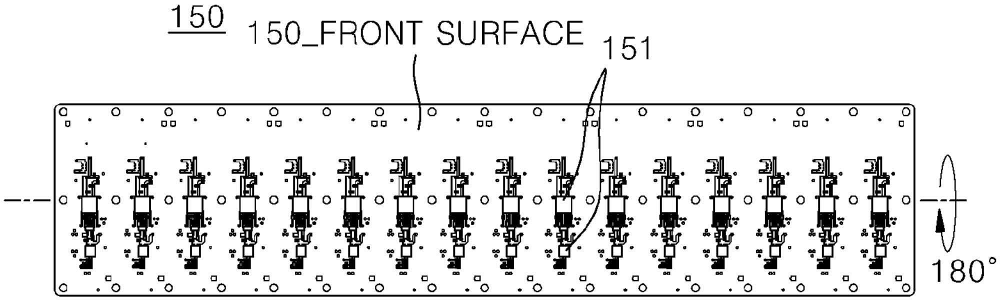
FIGS. 8A and 8B are front and rear views illustrating a sub-board among the components in FIG. 1.
Figure 8B:
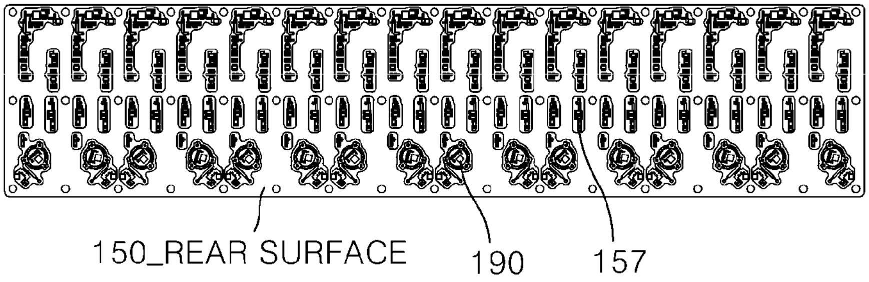
Figure 9:
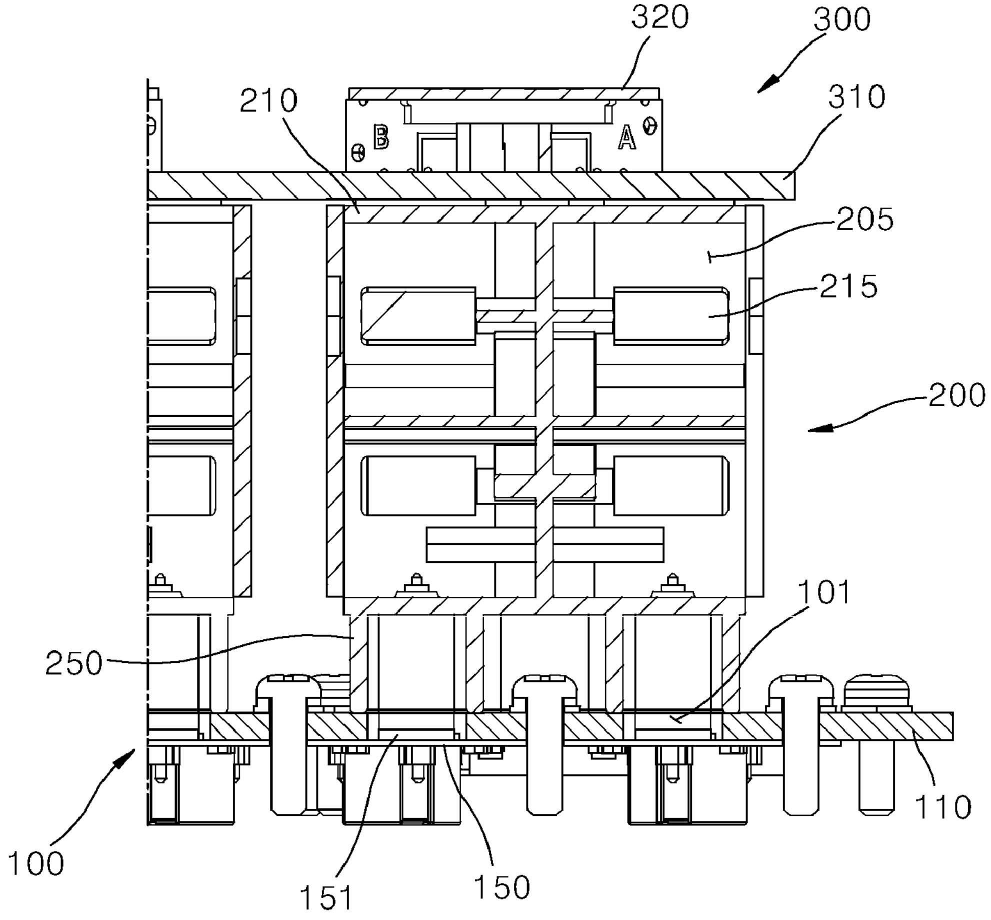
FIG. 9 is a cross-sectional view taken along line B-B in FIG. 3 and illustrating a state in which the multi-band filter, among the components in FIG. 1, is mounted.

FIGS. 8A and 8B are a front view and a rear view illustrating the sub-board among the components in FIG. 1, FIG. 9 is a cross-sectional view taken along line B-B in FIG. 3 and illustrating a state in which the multi-band filter is mounted among the components in FIG. 1, and FIGS. 10A to 10C are schematic views illustrating various embodiments in which a heat dissipation structure in FIG. 9 is implemented in detail.

In the multi-input and multi-output antenna apparatus 1 according to the embodiment of the present invention, a significant amount of driving heat may be generated from the first and third heating elements 111 and 181 of the main board 110 and the second heating element 151 of the sub-board 150 that operate by receiving power from the PSU 50.

The related art adopts the structure in which the plurality of heating elements 111, 151, and 181 are distributed and mounted on the front and rear surfaces of the main board 110, the heat generated from the heating elements 111, 151, and 181 is discharged rearward from the main board 110, and the plurality of heat sink fins of the antenna housing part disposed to be thermally in surface contact with the rear surface of the main board 110 dissipates heat.

However, there is a problem in that the amount of heat generated from the Tx element, which is the second heating element 151 of the plurality of heating elements 111, 151, and 181, is very large, but the efficiency in transferring heat rearward from the main board 110 (i.e., the heat dissipation performance) is very low because the heating elements are mounted on the front surface of the main board 110 made of a substrate material having low thermal conductivity.

To solve the above-mentioned problem, various following methods of designing the multi-input and multi-output antenna apparatus 1 according to the embodiment of the present invention are proposed.

Figure 10A:
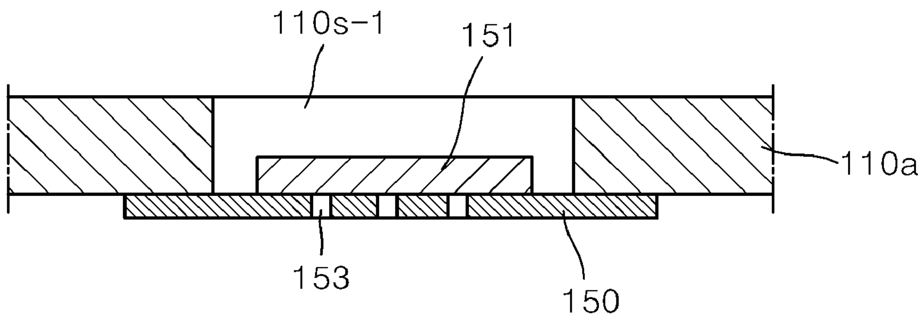
FIGS. 10A to 10C are schematic views illustrating various embodiments in which a heat dissipation structure in FIG. 9 is implemented in detail.

As a first embodiment, as illustrated in FIG. 10A, the multi-input and multi-output antenna apparatus 1 according to the present invention may include: a main board 110*a* having an accommodation space 110*s*-1 provided in the form of a predetermined space in at least one region; and a sub-board 150 stacked on a rear surface portion of the main board 110*a* and configured such that a plurality of heating elements (e.g., second heating elements 151) is mounted on a front surface portion of the sub-board 150 that is directed toward the accommodation space 110*s*-1.

Figure 10B:
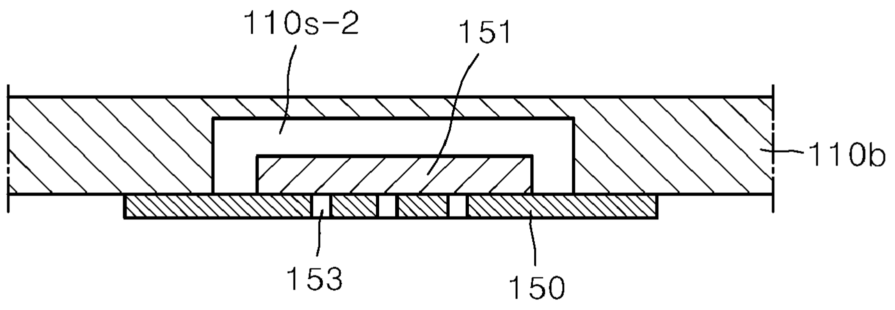

In addition, as a second embodiment, as illustrated in FIG. 10B, the multi-input and multi-output antenna apparatus 1 according to the present invention may include: a main board 110*b* disposed at a relatively front side; and a sub-board 150 having a front surface portion disposed and stacked to be in close contact with a part of a rear surface portion of the main board 110*b* and configured such that a plurality of heating elements 151 is mounted on the front surface portion of the sub-board 150 so that there is an area (see reference numeral '110*s*-2') that is not in contact with the rear surface portion of the main board 110*b*.

Figure 10C:
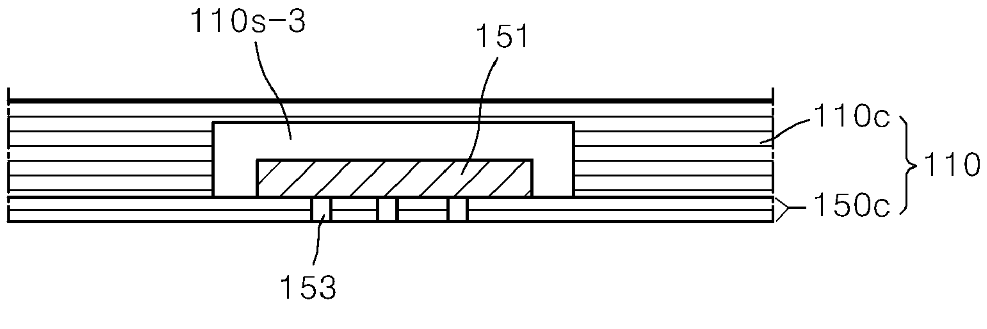

Meanwhile, as a third embodiment, as illustrated in FIG. 10C, the multi-input and multi-output antenna apparatus 1 according to the present invention may include: a main board 110*c* configured as an integrated circular board made by stacking multiple layers in a forward/rearward direction and integrally bonding the multiple layers, the main board 110*c* having an accommodation space 110*s*-3 formed in a region of a part of an rear surface portion thereof by removing at least some of the multiple layers; and a sub-board 150 stacked on a rear surface portion of a layer, which is positioned at a rearmost side of the main board 110*c* among the multiple layers, and configured such that a plurality of heating elements is mounted on a front surface portion of the sub-board 150 that is directed toward the accommodation space 110*s*-3.

In this case, the heat dissipation structure according to the first to third embodiments is characterized in that the heat generated from the heating elements 151 is dissipated to the rear surface portion of the sub-board 150.

To this end, one or more heat transfer bridge holes 153 may be formed in the sub-board 150 and serve to discharge heat rearward, the heat being generated from the heating elements 151.

In this case, the heat transfer bridge hole 153 may be processed in the form of a hole. The heat generated from the heating elements 151 may be discharged rearward through the heat transfer bridge hole 153, and the heat transfer bridge hole 153 may be filled with a metallic material excellent in thermal conductivity.

Therefore, the heat generated from the heating elements 151 mounted on the front surface portion of the sub-board 150 may be smoothly transferred to the rear surface portion of the sub-board 150 via the heat transfer bridge hole 153.

Meanwhile, the amount of thermal expansion of the sub-board 150, which is made by an increase in temperature according to the operation of the heating elements 151, may be smaller than the amount of thermal expansion of the main board 110. This is to prevent an increase in thermal contact resistance by minimizing thermal deformation by designing the sub-board 150 so that the sub-board 150 on which the second heating elements 151, which are predicted to generate a substantially largest amount of heat among the heating elements 111, 151, and 181, are mounted implements a small amount of thermal expansion.

Likewise, a thickness of the sub-board 150 in the forward/rearward direction may be designed to be smaller than a thickness of the main board 110 in the forward/rearward direction.

In general, the main board 110 is formed by integrally bonding the plurality of multiple layers, and non-illustrated patterns are designed along the layer. For this reason, there is a physical design limitation in reducing the number of layers.

According to the heat dissipation structure newly proposed in the multi-input and multi-output antenna apparatus 1 according to the embodiment of the present invention, the thickness of the main board 110 is maintained to be the design value in the related art, and the introduction of the sub-board 150 is proposed to substantially further improve the heat dissipation performance.

Circuit patterns, which correspond to the transmitting channel and the receiving channel, may be printed on the front surface of the sub-board 150 so that the second heating elements 151, which are predicted to generate a largest amount of heat among the heating elements 111, 151, and 181, are mounted.

The main board 110 may be formed so that the second heating elements 151 mounted on the sub-board 150 are exposed forward or at least accommodated in the accommodation space 110*s*-1 or 110*s*-3 within the area 110*s*-2 that is not in contact with the main board 110.

As illustrated in FIG. 10A, the accommodation space 110*s*-1 may be provided in the form of an opening portion formed through the main board 110*a* in the forward/rearward direction.

In addition, as illustrated in FIG. 10B, the non-contact area 110*s*-2 may be provided in a shape made by cutting a part of the rear surface of the main board 110*b* rearward.

Further, as illustrated in FIG. 10C, the accommodation space 110*s*-3 may be provided in a shape made by removing at least some of the multiple layers in a partial region among the multiple layers provided in the main board 110*c*. In this case, the sub-board 150 has a different name from the main board 110*c*, but the sub-board 150 may not be physically differentiated from the main board 110*c*, and the sub-board 150 may have two layers identical to the layers of the main board 110*c*, such that the sub-board 150 may be integrally bonded to the rear surface portion of the main board 110 so that the sub-board 150 is accommodated in the accommodation space 110*s*-3 in a state in which the second heating elements 151 are mounted on the front surface portion.

Meanwhile, when the first heating elements 111 are disposed on the front surface portion of the main board 110 and the second heating elements 151 are disposed on the front surface portion of the sub-board 150, output power (i.e., the amount of heat generation) of the second heating elements 151 may be set to be higher than output power (i.e., the amount of heat generation) of the first heating elements 111. This is to maximize the heat dissipation performance by positioning the second heating elements 151, which implement high output power, at the positions close to the plurality of heat sink fins of the antenna housing part. Therefore, the multi-input and multi-output antenna apparatus according to the embodiment of the present invention adopts a design in which the Tx element, which is the second heating element 151 that generates the relatively largest amount of heat among the heating elements 111, 151, and 181, is mounted and disposed on the front surface portion of the sub-board 150.

Further, digital semiconductors, such as an FPGA, are mounted and disposed as the third heating elements 181 on a portion of the rear surface portion of the main board 110 that does not overlap the front surface portion of the sub-board 150. The heat generated from the third heating elements 181 of the main board 110 may be dissipated to the rear surface portion of the sub-board 150 together with the heat generated from the plurality of second heating elements 151 of the sub-board 150.

In this case, the third heating elements 181 are mounted on the rear surface portion of the main board 110 in a range in which the sub-board 150 and the main board 110 do not overlap each other. Therefore, the third heating elements 181 may be thermally in direct surface contact with the inner surface of the antenna housing part, so that the thermal conduction is implemented.

Meanwhile, as illustrated in FIG. 10C, in case that the sub-board 150 is configured as a multilayer substrate having two layers, active elements, which are some of the heating elements, may be mounted and disposed on a layer corresponding to the front surface of the sub-board 150, and passive elements, which are the remaining heating elements, may be disposed on a layer corresponding to the rear surface of the sub-board 150. In this case, the heat generated from the active and passive elements is, of course, dissipated to the rear surface of the sub-board 150.

In this case, a ground pattern (GND pattern) (not illustrated) may be formed between the heating elements (passive elements) on the layer corresponding to the rear surface of the sub-board 150. The ground pattern is in contact with the inner surface of the antenna housing part on which the main board 110 and the sub-board 150 are installed and serves to block electromagnetic waves generated from the sub-board 150. As described above, the heating elements are distributed and disposed on the front and rear surface portions of the sub-board 150 disposed on the rear surface portion of the main board 110, which makes it possible to increase an area of the ground pattern (GND pattern) that may be formed between the heating elements. Further, the increase in area of the ground pattern increases a contact area with the inner surface of the antenna housing part, which makes it possible to achieve a further improved factor for blocking the electromagnetic waves.

Further, although not illustrated in the drawings, the sub-board 150 may further include an oscillation prevention circuit configured to prevent the oscillation of the heating elements. The oscillation prevention circuit may prevent high-frequency oscillation caused by the circuit configuration of the heating elements, thereby minimizing driving heat and easily dissipating the minimized driving heat to the rear surface of the sub-board 150.

According to the multi-input and multi-output antenna apparatus according to the embodiment of the present invention, the heating elements, which have been concentratedly mounted on the main board 110 provided in the form of a circular board in the related art, are distributed and mounted on the sub-board 150, which makes it possible to prevent thermal concentration. Further, the heat is effectively dissipated rearward by means of the plurality of heat sink fins of the antenna housing part provided on the rear surface of the sub-board 150, which makes it possible to improve overall heat dissipation performance.

The embodiments of the multi-input and multi-output antenna apparatus according to the present invention have been described above in detail with reference to the accompanying drawings. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the multi-input and multi-output antenna apparatus capable of improving heat dissipation performance by more easily dissipating heat, which is generated from the heating elements, to the outside of the antenna housing part by using the sub-board independently of the main board.

The invention claimed is:

1. A multi-input and multi-output antenna apparatus comprising:

a main board having an accommodation space formed in at least one region and provided in the form of a predetermined space;

a sub-board stacked on a rear surface portion of the main board and configured such that a plurality of heating elements is mounted on a front surface portion of the sub-board that is directed toward the accommodation space;

a plurality of filters each having an accommodation space to accommodate a resonator, the plurality of filters being seated on a front portion of the main board;

an antenna board stacked on front portions of the plurality of filters and having a front surface on which a plurality of antenna elements are mounted; and a clamshell part integrated with a rear end of each of the plurality of filters, wherein heat generated from the heating elements is dissipated to a rear surface portion of the sub-board, and wherein the clamshell part comprises a transmitting/receiving partition rib configured to spatially separate and isolate a region of the transmitting channel and a region of the receiving channel.

2. The multi-input and multi-output antenna apparatus of claim 1, wherein the main board is disposed relatively forward of the sub-board, wherein the front surface portion of the sub-board is disposed and stacked to be in close contact with a part of a rear surface portion of the main board, wherein the accommodation space is formed in an area that is not in contact with the rear surface portion of the main board, and wherein the plurality of heating elements is mounted on the front surface portion corresponding to the accommodation space.

3. The multi-input and multi-output antenna apparatus of claim 1, wherein the main board is an integrated circular board made by stacking multiple layers in a forward/rearward direction and integrally bonding the multiple layers, wherein the accommodation space is formed by removing at least some of the multiple layers in a partial region of the rear surface portion, wherein the sub-board is stacked on a rear surface portion of a layer positioned at a rearmost side of the main board among the multiple layers, and wherein the plurality of heating elements is mounted on the front surface portion that is directed toward the accommodation space.

4. The multi-input and multi-output antenna apparatus of claim 1, wherein the amount of thermal expansion of the sub-board, which is made by an increase in temperature according to an operation of the heating elements, is smaller than the amount of thermal expansion of the main board.

5. The multi-input and multi-output antenna apparatus of claim 1, wherein a thickness of the sub-board in a forward/rearward direction is smaller than a thickness of the main board in the forward/rearward direction.

6. The multi-input and multi-output antenna apparatus of claim 1, wherein first heating elements are disposed on a front surface portion of the main board, wherein second heating elements are disposed on the front surface portion of the sub-board, and wherein output power of the second heating elements is higher than output power of the first heating elements.

7. The multi-input and multi-output antenna apparatus of claim 6, wherein the first heating element is an Rx element (LNA), and the second heating element is a Tx element (PA and DA).

8. The multi-input and multi-output antenna apparatus of claim 6, wherein third heating elements are further disposed on the rear surface portion of the main board.

9. The multi-input and multi-output antenna apparatus of claim 8, wherein the third heating element includes an FPGA.

10. The multi-input and multi-output antenna apparatus of claim 1, wherein digital semiconductors are mounted and disposed on a portion of the rear surface portion of the main board that does not overlap the front surface portion of the sub-board, and wherein heat generated from the digital semiconductors of the main board is dissipated to the rear surface portion of the sub-board together with heat generated from the plurality of heating elements of the sub-board.

11. The multi-input and multi-output antenna apparatus of claim 1, wherein the main board and the sub-board are each made of epoxy resin.

12. The multi-input and multi-output antenna apparatus of claim 1, wherein the main board includes a plurality of sections having a plurality of transmitting/receiving channels, and wherein the sub-board corresponds in number to the plurality of sections.

13. The multi-input and multi-output antenna apparatus of claim 1, wherein the sub-board further comprises an oscillation prevention circuit configured to prevent oscillation of the heating elements.

14. The multi-input and multi-output antenna apparatus of claim 3, wherein the sub-board is a multilayer substrate having at least two layers.

15. The multi-input and multi-output antenna apparatus of claim 14, wherein active elements, as some of the heating elements, are mounted and disposed on a layer corresponding to a front surface of the sub-board, wherein passive elements, as the remaining heating elements, are disposed on a layer corresponding to a rear surface of the sub-board, and wherein heat generated from the active and passive elements is dissipated to the rear surface of the sub-board.

16. The multi-input and multi-output antenna apparatus of claim 15, wherein a ground pattern (GND pattern) is formed between the heating elements on the layer corresponding to the rear surface of the sub-board, wherein the ground pattern is in contact with an inner surface of an antenna housing part on which the main board and the sub-board are installed, and wherein the ground pattern increases an area for blocking an electromagnetic wave generated from the sub-board.

17. The multi-input and multi-output antenna apparatus of claim 14, wherein the sub-board has at least two layers bonded in the same way as the multiple layers of the main board.

18. The multi-input and multi-output antenna apparatus of claim 1, wherein at least one heat transfer bridge hole is formed in the sub-board so that heat generated from the heating elements is discharged rearward.

19. The multi-input and multi-output antenna apparatus of claim 18, wherein the heat transfer bridge hole is filled with a thermally conductive material.

20. The multi-input and multi-output antenna apparatus of claim 18, wherein the sub-board is a metal PCB.

21. The multi-input and multi-output antenna apparatus of claim 1, further comprising:

an antenna housing part comprising:

a front portion having a mounting space in which the main board and the sub-board are installed; and a rear portion integrated with a plurality of heat sink fins configured to receive heat generated from the heating elements and dissipate the heat to the outside.

22. The multi-input and multi-output antenna apparatus of claim 21, wherein the rear surface portion of the sub-board and an inner surface of the antenna housing part are thermally in surface contact with each other so that heat generated from the heating elements is transferred to the rear surface portion of the sub-board and dissipated through the plurality of heat sink fins.

23. The multi-input and multi-output antenna apparatus of claim 1, wherein a plurality of transmitting channels and a plurality of receiving channels corresponding to the electrical signal lines are provided on a front surface of the main board.

24. The multi-input and multi-output antenna apparatus of claim 23, wherein the clamshell part further comprises transmitting part partition ribs configured to spatially separate and isolate a pair of transmitting circuit patterns provided in the transmitting channels and spaced apart from each other at a predetermined distance.

25. The multi-input and multi-output antenna apparatus of claim 24, wherein at least one position fixing protrusion protrudes from a rear end of each of the plurality of filters toward the main board, and wherein when the at least one position fixing protrusion is seated in at least one positioning groove formed at a corresponding position of the main board, the transmitting/receiving partition rib and the transmitting part partition ribs of the clamshell part completely separate the region of the transmitting channel, the region of the receiving channel, and the transmitting circuit pattern.

26. The multi-input and multi-output antenna apparatus of claim 1, wherein a pair of main-board-side RF connectors is provided at the rear end of each of the plurality of filters and electrically connected to the main board, and wherein a pair of antenna-board-side RF connectors is provided at a front end of each of the plurality of filters and electrically connected to the antenna board stacked on the front ends of the plurality of filters.

* * * * *